Dec. 15, 1931.  W. H. ALLEN ET AL  1,836,426
PROCESS OF SEPARATING SODIUM SALTS FROM MIXTURES THEREOF
Filed Feb. 1, 1930  3 Sheets-Sheet 1

Dec. 15, 1931.  W. H. ALLEN ET AL  1,836,426
PROCESS OF SEPARATING SODIUM SALTS FROM MIXTURES THEREOF
Filed Feb. 1, 1930  3 Sheets-Sheet 2

Inventors
William H. Allen
William A. Gale
By Charles F. Ritchie
Attorneys

Patented Dec. 15, 1931

1,836,426

UNITED STATES PATENT OFFICE

WILLIAM H. ALLEN, WILLIAM A. GALE, AND CHARLES F. RITCHIE, OF TRONA, CALIFORNIA, ASSIGNORS TO AMERICAN POTASH & CHEMICAL CORPORATION, OF TRONA, CALIFORNIA, A CORPORATION OF DELAWARE

PROCESS OF SEPARATING SODIUM SALTS FROM MIXTURES THEREOF

Application filed February 1, 1930. Serial No. 425,203.

This invention relates to new and useful methods for separating sodium sulphate and/or sodium carbonate and/or sodium chloride from admixture or combination with each other either alone or in the presence of other salts. Such complexes may exist either in the form of solution as in the case of various natural or artificial brines, or in the solid state, as in the case of the double salt burkeite ($Na_2CO_3.2Na_2SO_4$), or of mechanical mixtures of the various salts.

In the evaporation and manipulation of brines such as those of Searles and Owens Lakes, California, for the recovery of borax and potash, large quantities of such sulphate-carbonate complexes and mixtures are obtained, and it is in the utilization of these materials that the process of this invention is of special value.

Application for United States Letters Patent, Serial Numbers 308,496 and 309,279, filed September 26, 1928, and September 29, 1928, set forth methods and equipment by which various sodium salts may be precipitated and separated from suitable brines. The aforementioned processes produce from Searles Lake brine sodium chloride, containing small amounts of carbonate and sulphate of sodium. Those processes also produce a sulphate-carbonate complex, containing small amounts of sodium chloride. A sulphate-carbonate complex called burkeite, having an approximate formula $Na_2CO_3.2Na_2SO_4$, is produced from Searles Lake brine. Likewise other sulphate-carbonate complexes, such as $2Na_2CO_3.3Na_2SO_4$, may be precipitated from such brine during evaporation.

While the former double salt has been termed burkeite in past literature, we wish to include in this classification other similar complexes, such as the last mentioned complex, which are similar in their characteristics with the true burkeite and may be true double salts or mixed crystals.

In addition to such complexes, continued high temperature evaporation of Searles Lake, Owens Lake and similar brines results in the precipitation of a certain amount of sodium carbonate monohydrate ($Na_2CO_3.H_2O$). These carbonate and sulphate salts together with a small amount of sodium chloride are separated to a substantial degree from the bulk of the sodium chloride, precipitated during evaporation of such brines, by the processes and equipment of the aforementioned applications for United States Letters Patent. The refining and recovery of pure salts from these and similar mixtures is one of the objects of the present invention.

In the past no satisfactory method has been known for the economical separation of sodium sulphate from such sulphate-carbonate complexes which would be suitable for use on a commercial scale. As a result, such material, produced as a by-product in the borax and potash industry, has been discarded as waste. Various methods of treatment have been suggested: for example, the fractional and successive precipitation of sodium sulphate and sodium carbonate from solution by the addition of ammonia, has been proposed. However, such a process is found not to be operable due to the formation and precipitation of the double salt burkeite, which has a very low solubility in the presence of ammonia. In order to precipitate sodium carbonate from a sulphate-carbonate complex by cooling or by saturation with ammonia, it is necessary that the ratio of carbonates to sulphates be very high, and also, the actual concentration of sodium sulphate be very small. It is therefore another object of the present invention to provide a process for manipulating sulphate-carbonate complexes and/or mixtures which is capable of changing the ratio of carbonates to sulphates in solution so that the resulting carbonate concentration is several times that of the sulphate concentration; so that a solution is obtained having a low sulphate concentration, suitable for precipitation of sodium carbonate by cooling alone or through the use of ammonia or carbon dioxide gas.

Other objects of the invention will become apparent from the following exposition.

The process of the present invention is in part, at least, a cyclic process and the point at which the process starts is dependent in part upon the nature of the raw material, i. e. the ratio of sulphates to carbonates in the raw material, and further, upon whether the sulphate-carbonate complex to be treated contains an appreciable content of sodium chloride.

In case of sulphate-carbonate mixture or a complex such as burkeite, having a greater ratio of sulphate to carbonate than that of a solution at the point saturated with burkeite and the dekahydrates of the two single salts and containing little or no sodium chloride, the first step of the process consists in manipulation of the complex or mixture with water in the Glauber salt ($Na_2SO_4.10H_2O$) field, in order to precipitate this salt. The manipulation is preferably conducted by dissolving the complex in water at a temperature below the transition temperature between Glauber salt, sal soda and the double salt burkeite, sufficient of the complex being added to exceed the saturation point of the Glauber salt with a result that this salt is precipitated, thereby increasing the ratio of carbonate to sulphate in solution. Sufficient of the complex is added to increase the ratio of carbonate to sulphate in solution in excess of that which exists in burkeite or similar complex, and preferably sufficient to arrive substantially at the point of saturation of sal soda (sodium carbonate dekahydrate), and of course, Glauber salt.

The resulting solution will be hereinafter described as the "cold sulphate liquor" for the purpose of identification, regardless of its method of production. This step of the process is valuable as applied to all complexes or mixtures, substantially free of sodium chloride, the ratio of carbonate to sulphate of which is less than, or only slightly greater than, unity.

Preferably the operation is conducted at that temperature suitable for causing the mixture in this operation to substantially reach the transition point between burkeite, sal soda, and Glauber salt. This step of the process may be employed upon complexes which have a carbonate-sulphate ratio greater than that of burkeite, but less than that corresponding to the said transition point.

It is also possible to effect a partially equivalent operation through manipulating the complex in the lower part of the anhydrous sulphate field by dissolving the complex at a temperature just above the transition temperature between the anhydrous sodium sulphate and Glauber salt. When this is done, by an addition of an excess of the complex to water, sufficient to exceed the saturation point of the solution with respect to the anhydrous sodium sulphate, anhydrous sodium sulphate may be caused to precipitate until the solution reaches a point of saturation with respect to burkeite and anhydrous sodium sulphate. The ratio of carbonate to sulphate may be thus increased, starting with any mixture or complex of sulphate and carbonate whose ratio of carbonate to sulphate is less than that of a solution saturated with respect to burkeite and anhydrous sodium sulphate at the temperature employed. However, when operating in this field, the increase in the ratio between the carbonate and sulphate which can be secured is less than that which can be secured when operating in the Glauber salt field. Moreover, the process is slow in the anhydrous sodium sulphate field, while it is a rapid process in the Glauber salt field.

The next operation in the process is the heating of any solution of such composition as obtained on separation of Glauber salt from the first operation, i. e. the cold sulphate liquor. With less advantage and efficiency this operation may be applied for increasing the ratio of carbonate to sulphate of many solutions or materials in which the ratio of carbonates to sulphates is greater than that of burkeite.

The cold sulphate liquor or any solution saturated or essentially saturated with carbonate and sulphate at a low temperature, having a greater ratio of carbonate to sulphate than burkeite, is heated above the transition point of the single hydrated salts to burkeite, and sodium chloride is added in sufficient amount to essentially saturate the solution with this salt at the temperature to which it has been heated. Just sufficient common salt is added to reach saturation, so that no sodium chloride will remain undissolved. The order in which the heating and the addition of sodium chloride is carried out is immaterial and both may be done simultaneously. The effect of the addition of sodium chloride is to greatly decrease the solubility of burkeite. Accordingly, this salt

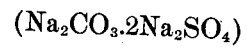

$$(Na_2CO_3.2Na_2SO_4)$$

is precipitated from the solution to such an extent that only a small amount of sulphate remains in the mother liquor. The burkeite precipitated in this step is separated from the hot liquor and may be utilized in the first step for retreatment either by itself or together with a fresh batch of material. The resulting hot liquor is termed "hot carbonate liquor" for further reference, the term applying to any such liquor saturated with sodium chloride and burkeite, having a high carbonate concentration and a small sulphate concentration.

In those cases where the sulphate-carbonate complex to be processed contains a material quantity of sodium chloride, it is important that the sodium chloride be removed before the first operation. In such a case this contaminated complex may be added in place of sodium chloride to the heated solution in sufficient quantities so that its sodium chloride content will saturate the solution. The burkeite content of the impure common salt will be precipitated or remain undissolved along the burkeite precipitated from the solution itself.

The hot carbonate liquor, after separation from burkeite contains a high ratio of carbonate to sulphate, and very little of the latter. In this condition, it may be cooled until it becomes saturated with respect to sodium carbonate dekahydrate or heptahydrate. This cooling to the point of saturation may cause the precipitation of a small quantity of pure sodium chloride, which may be separated at this point, yielding a valuable commodity for commercial use, or for use in the cyclical process. After the removal of sodium chloride, the solution may be additionally cooled, precipitating sal soda until the point of saturation with Glauber salt is reached. By such a process a large yield of pure sodium carbonate is attainable. The solution also, usually after slight dilution may be used to precipitate sodium carbonate monohydrate by the addition of ammonia, instead of the final cooling operation just specified. Likewise the solution may be treated with carbon dioxide gas for the removal of the carbonate content thereof.

The process of the present invention will best be understood from the description of a preferred form or example of the process embodying the invention, the process being described in connection with the accompanying drawings, in which Figure 1 is a polytherm representing the solubility and phase relations for the system $Na_2SO_4$—$Na_2CO_3$—$H_2O$, at all temperatures between 0° C. and 100° C.

In Figure 2 the 50° isotherm $a$—$b$—$d$—$e$ in Figure 1 has been superimposed in order to better show the effect of sodium chloride on the solubility of burkeite.

Figure 1:
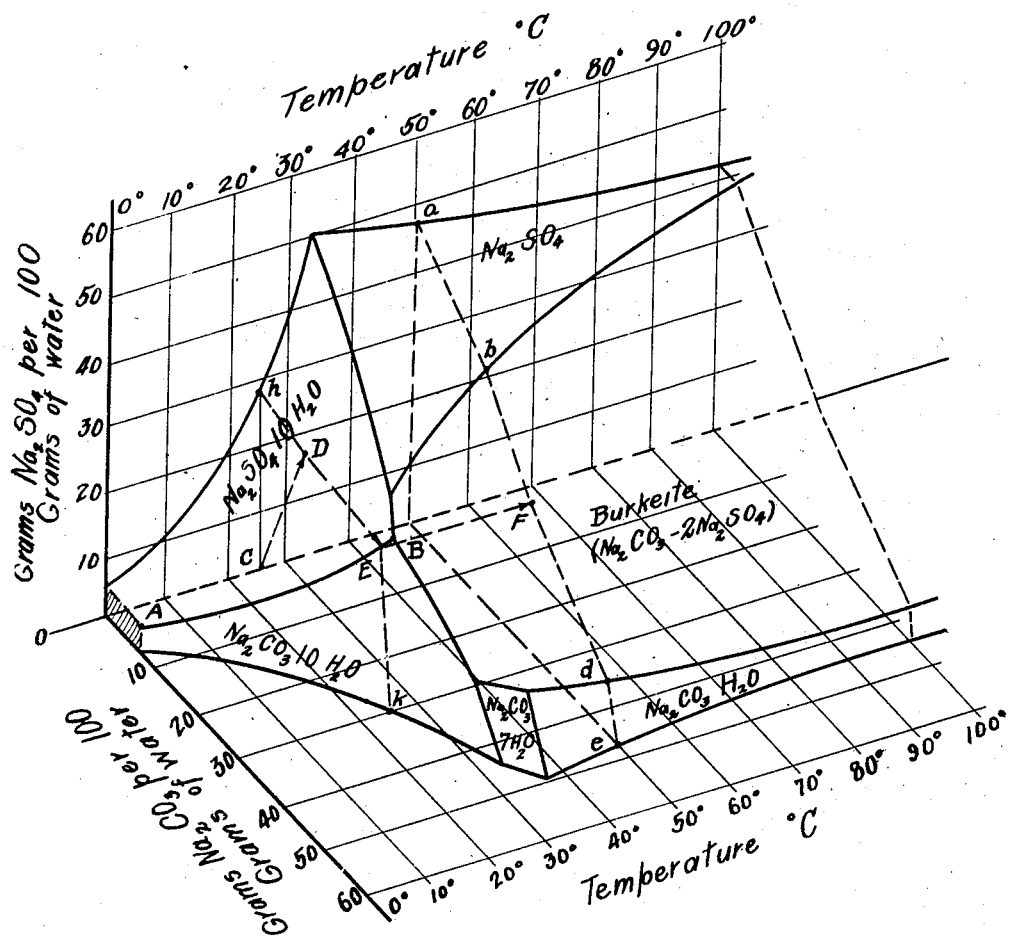

Referring first to Figure 1 of the drawings there is represented in the perspective a polytherm of the system sodium sulphate, sodium carbonate and water, upon the outer surfaces or fields of which there is indicated the particular solid phase with which the solution at the corresponding concentration and temperature is saturated. A boundary between two fields represents the field of existence of solutions saturated with two adjacent phases. The intersection of three boundaries represents the composition of the liquid phase of the invariant system containing the three adjacent solid phases.

Figure 2:
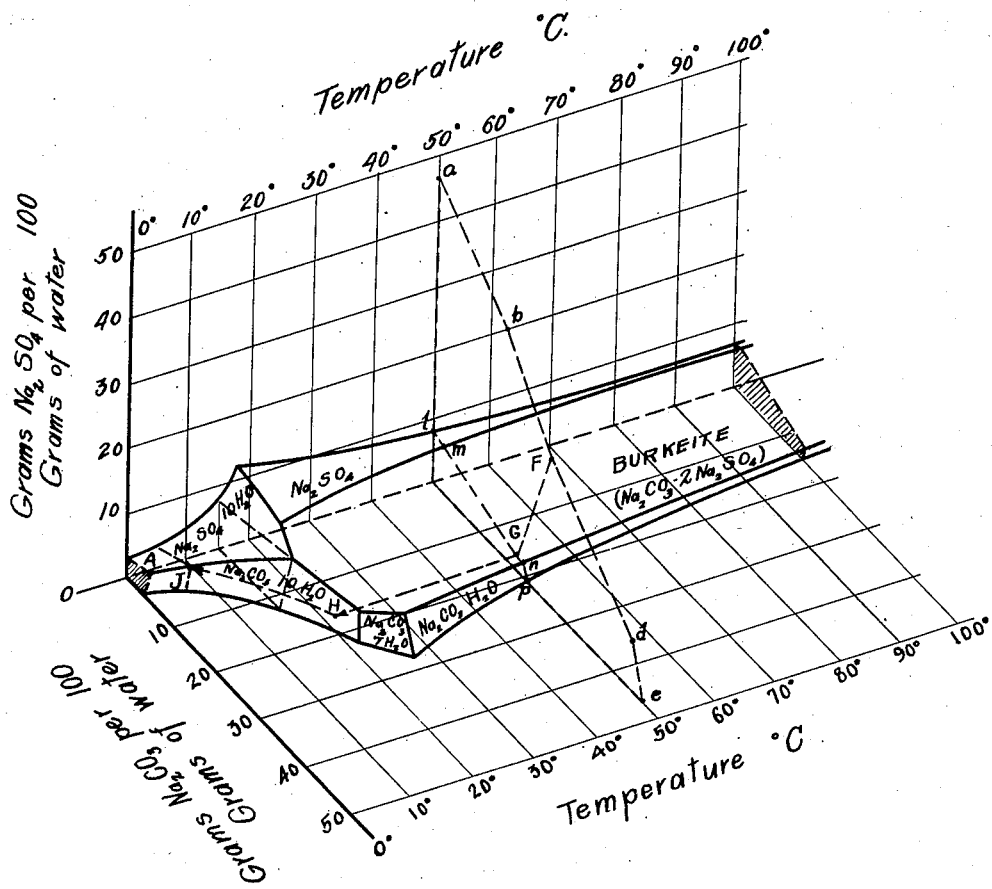
Figure 2 is a polytherm of the same system, saturated with sodium chloride.

Thus in Figure 1 the line A—B represents the composition of all solutions saturated with the two salts $Na_2SO_4.10H_2O$ and $Na_2CO_3.10H_2O$, while the point B represents the composition of the solution at the temperature of transition of the two single hydrated salts to the anhydrous double salt burkeite, $Na_2CO_3.2Na_2SO_4$. The effect of sodium chloride on the various solubilities and transition temperature is obviously seen from a comparison of Figures 1 and 2. For example, the point B in the absence of sodium chloride and other impurities is at approximately 26° C., while in saturated sodium chloride solution the temperature of this transition point is approximately 15° C. We are aware of the fact that the dekahydrates of both sodium carbonate and sodium sulfate tend to form a limited series of mixed crystals while separating from solutions containing both salts. However, we have found that this tendency is so slight that it does not cause any serious contamination of the single salts, and therefore has no appreciable effect on the usefulness of our invention.

In the preferred process we employ salt mixtures consisting of what are termed "salt trap" salts and "clarifier" salts. The former contain about 60% sodium chloride, 20% sodium sulphate and 10% sodium carbonate, while the latter contain about 40% sodium sulphate, 35% sodium carbonate and 10% sodium chloride, the remainder in both cases being water and insoluble matter. The so-called "salt trap" salt comprises a mixture of common salt together with a small amount of sulphate-carbonate complex similar to burkeite.

Clarifier salt contains a large proportion of the sulphate-carbonate complex together with small amounts of common salt and some sodium carbonate monohydrate. The presence of this small quantity of sodium carbonate monohydrate is very desirable in the final production of the hot carbonate liquor.

At this point we have an alternative regarding the primary treatment of such mixture as herein described. In order to produce a satisfactory cold sulphate liquor, it is requisite that little or no sodium chloride be present. Hence, it is necessary to remove from the raw material employed in the first step of the process the sodium chloride; for example, by leaching. Said leaching may be done with water, or it may be accomplished by use of the cold sulphate liquor in producing from that liquor the hot carbonate liquor. For most efficient results with the latter process, it is preferable that the raw material, so leached, should contain sodium chloride in amounts equal to or less than that required for the saturation of the cold sulphate liquor in the production of the hot carbonate liquor. If a raw material does contain sodium chloride in excess to that required, it may be given a partial leach with water to reduce the sodium chloride content to the desired value, either prior or subsequent to the treatment resulting in the production of the hot carbonate liquor.

Since the process of this invention is, in part at least, cyclical the following example will be set forth as starting at a point where there is available a sodium sulphate-carbonate complex, substantially freed from sodium chloride. Said raw material was produced by leaching clarifier salt and contained approximately 34% $Na_2CO_3$ and 66% $Na_2SO_4$ on a dry basis. To, for example, 1000 pounds of this complex, we add 1,721 pounds of water and stir the mixture while maintaining the temperature at 22°–25° C., or at a temperature closely approximating that of the transition point B, although preferably operating slightly under this point.

In practice, the operation of the present invention is cyclical and considerable burkeite, resulting from the production of the hot carbonate liquor, is also utilized in this first step. But for the sake of simplicity and brevity the utilization of leached clarifier salts alone are herewith described.

Figure 3:
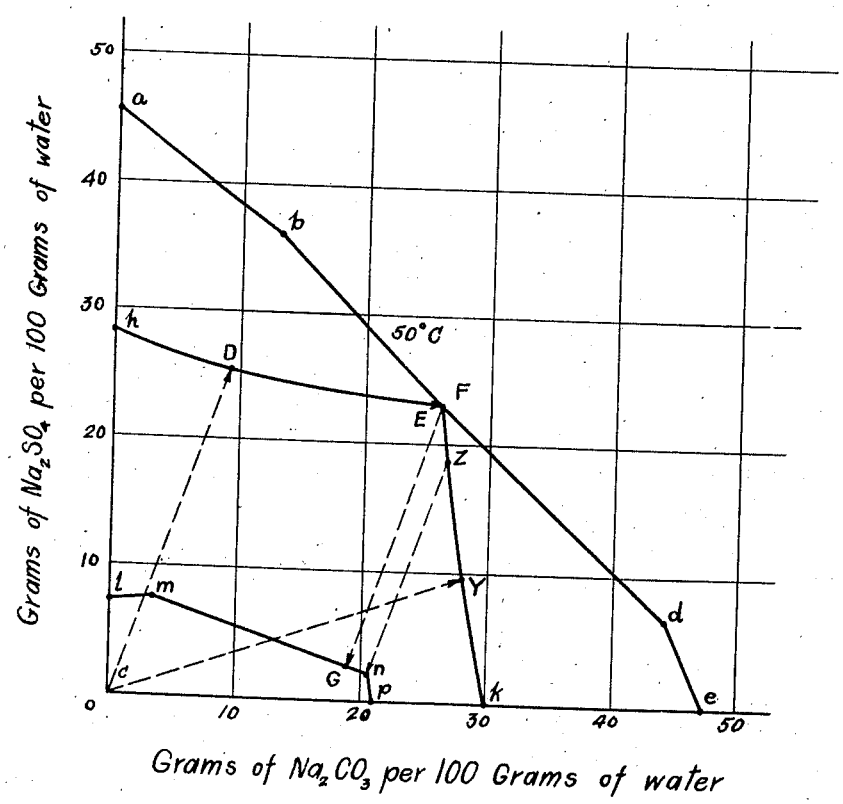
Figure 3 is a diagram of the 50° isotherm $a$—$b$—$d$—$e$ together with the same isotherm $l$—$m$—$n$—$p$ when saturated with sodium chloride and the 25° C. isotherm $h$—$E$—$k$ from Figure 1.

In dissolving true burkeite the composition of the solution would travel out from the origin at 25° C. along the lines O—D in Figures 1 and 3 to the point D at which the solution reaches saturation with Glauber salt $(Na_2SO_4.10H_2O)$. After reaching a point on the line $h$—E, the complex continues to dissolve and Glauber salt separates while the solution follows along the line $h$—E toward E. During this operation suitable means must be used for cooling the solution, since the process evolves heat. The amounts of water and salts chosen are such that upon the solution reaching the composition E; that is, saturated with Glauber salt and substantially saturated with sal soda, all of the complex will have been dissolved. At the point E, which is generally chosen as approximately at the point B, although slightly below the same, the solution has reached saturation with $Na_2CO_3.10H_2O$. During this process Glauber salt, weighing approximately 825 pounds is precipitated and is filtered or otherwise separated from the solution, said solution comprising the cold sulphate liquor.

This salt is given a slight wash with cold water and then contains little sodium carbonate or other impurities. The cold sulphate liquor which weighs essentially 1896 pounds has approximately the following composition:

| | Pounds |
|---|---|
| $Na_2CO_3$ | 340 |
| $Na_2SO_4$ | 296 |
| Water | 1260 |

The cold sulphate liquor is then heated to some suitable temperature so that the composition of the solution is within the burkeite field. The exact temperature of heating is dependent upon the quantity of sulphate which will be permissible during the subsequent steps of recovering sodium carbonate; the higher the temperature of heating, the lower the sulphate content of the resulting hot carbonate liquor, and, likewise, the greater the heating the greater will be the yield of pure sodium chloride produced.

However, excessively high temperature of heating lowers the carbonate content of the liquor, thereby decreasing the quantity recoverable from a given quantity of liquor in subsequent operations. Also, excessive heating may cause the precipitation of sodium carbonate monohydrate from the liquor, which however may be redissolved by the addition of water.

We have found the temperature of 50° C. to be satisfactory for the process herein described. The heating operation causes the solution to follow the line E—F in Figure 1. The solution is then brought to saturation with respect to sodium chloride, which requires the addition of 327 pounds of said salt. This treatment causes the solution to precipitate burkeite, following the line F—G in Figures 2 and 3, reaching the point G, or a point near G on the line $n$—$m$, at which point the solution is saturated with sodium chloride and burkeite and nearly saturated with respect to sodium carbonate monohydrate.

This operation precipitates burkeite, producing from cold sulphate liquor the hot carbonate liquor of the following composition:

| | Pounds |
|---|---|
| $Na_2CO_3$ | 243 |
| $Na_2SO_4$ | 32 |
| NaCl | 327 |
| Water | 1260 |

The precipitated burkeite weighs approximately 361 pounds and is filtered off from the solution and returned to step 1 of the process to be retreated together with a fresh batch of material, (e. g. with leached clarifier salts). The hot carbonate liquor is then further treated for the recovery of the sodium carbonate and sodium chloride contents, as hereinafter described.

The process is commenced with 1000 pounds of the complex, while 360 pounds of burkeite are recrystallized and returned. Thus, only 396 pounds of anhydrous sodium sulphate are consumed and there are recovered 825 pounds of Glauber salts containing 364 pounds anhydrous sodium sulphate. This represents a net recovery of $Na_2SO_4$ of approximately 92%.

In the just described process, in place of saturating the solution at the point F with pure sodium chloride, it is advantageous to employ salt trap salt of the composition supra, using sufficient of this salt trap salt to supply the required 327 pounds of sodium chloride essential to saturate the solution. By so doing, the carbonate and sulphate content of the salt trap salt is purified of sodium chloride and recovered for use in the process. The carbonate and sulphate content of the added salt remains undissolved and is present with the precipitate of burkeite from the solution, which is returned to the cyclical process.

While impure sodium chloride, such as salt trap salt, is advantageously employed in the production of the hot carbonate liquor, as just described, even greater advantage accrues from the use of clarifier salt, of composition supra. The requisites for gaining this added advantage in toto are that said clarifier salt or similar mixture should contain sodium sulphate and sodium carbonate in ratio not exceeding 2.7 to one; it should preferably contain free sodium carbonate, and it should contain not more than sufficient sodium chloride to saturate the liquor as hereinbefore set forth. As a matter of fact, clarifier salt fulfills these requirements.

In this variation of the present invention, which is a highly preferred form, the whole of the cold sulphate liquor produced is mixed with all the clarifier salt available, said clarifier salt supplying the major portion of the complex utilized in step 1 of the process. Sufficient salt trap salt, or other form of sodium chloride is added to supply the requisite saturation with respect to NaCl; and the mixture is heated, as described.

Due to the presence of carbonate monohydrate in clarifier salt, the resulting hot carbonate liquor reaches point $n$, Figure 3, saturated with sodium chloride, sodium carbonate monohydrate and burkeite, and consequently contains more sodium carbonate and less sodium sulphate than the previously described liquor at point G. This is very desirable. The burkeite or sulphate-carbonate complex content of the clarifier salt remains undissolved, since burkeite is precipitated by virtue of the heating and salting out treatment of the cold sulphate liquor.

If an excess of sodium carbonate monohydrate exists in the sludge after treatment of the cold sulphate liquor with heat and salt, then sufficient water may be added to effect its complete solution, producing a hot carbonate liquor essentially saturated with sodium chloride, burkeite and sodium carbonate monohydrate at the temperature employed. The excess of carbonate-sulphate complex and burkeite is then filtered out and returned to the cyclical process for the production of sodium sulphate and the cold sulphate liquor. In the case of the clarifier salt above described, it has been found practicable to add both water and salt trap salt to the mixture of cold sulphate liquor and clarifier salt to produce the desired hot carbonate liquor of composition $n$; and thereby providing an increased quantity of hot carbonate liquor of maximum value and simultaneously providing the desired raw material for the first step of the process.

While it is possible (and we have done so in the past) to employ water for the removal of sodium chloride (and sodium carbonate monohydrate together with small amounts of the complex) from the clarifier salt, subsequently adding this leach liquor to the cold sulphate liquor prior to the heating and salting-out step, the combined procedure just described is preferred as it simplifies the process and insures the production of the optimum hot carbonate liquor.

If it is found after the above treatment of clarifier, or like salt, with cold sulphate liquor that the resulting precipitated burkeite and undissolved sulphate-carbonate complex contains residual sodium chloride, said solids, after removal from the hot carbonate liquor, may be subjected to appropriate treatment with water for the dissolution of the undesirable sodium chloride. This may be accomplished by means of sufficient washing with hot water on the filter or centrifugal machine, employed for its recovery from the hot carbonate liquor; or, the same result may be accomplished by other leaching means.

By this process burkeite or any other mixture of sodium carbonate and sodium sulphate substantially free of sodium chloride, containing more sodium sulphate than sodium carbonate, is digested, at or below the temperature of the transition point of the dekahydrate of sodium sulphate and sodium carbonate to the double salt burkeite. The resulting solution contains more carbonate than sulphate and the excess sodium sulphate therefore precipitates in the form of Glauber salt or remains as an undissolved residue, depending upon the form in which it occurs in the original material. The net result is a solution containing essentially all the carbonate and part of the sulphate of the material with any soluble impurities that may be present, while the solid phase represents practically pure sodium sulphate in the form of Glauber salt.

The solid Glauber salt, produced in the foregoing example, is filtered off, washed free of mother liquor and may be marketed as such or may be treated for the production of anhydrous sodium sulphate. For example, Glauber salt may be dissolved in a minimum of water at or near the temperature of maximum solubility which is approximately 32.4° C. for the pure solution (see Figure 1). The resulting saturated solution of sodium sulphate may then be evaporated at any temperature above the transition point, in a triple effect evaporator, for instance, and pure anhydrous sodium sulphate precipitated. Such precipitated anhydrous sulphate is separated from the mother liquor by any suitable means, such as a continuous vacuum filter or a centrifugal. The mother liquor is suitable for further processing of Glauber salts. The product is suitable for the market as obtained.

The saturated solution of sodium sulphate may be treated with ammonia gas for the precipitation of anhydrous sodium sulphate. To this end ammonia gas is caused to distil into and be absorbed in the solution, resulting in the precipitation of the desired salt. After removing the precipitated sodium sulphate therefrom, the residual liquor is heated and boiled for the recovery of the dissolved ammonia, the same being utilized for the further precipitation of sodium sulphate from concentrated sulphate solution while the residual liquor may be used in part for further dissolution of Glauber salt.

While the foregoing methods produce a very satisfactory product, the expense of heating, boiling, and evaporation is somewhat undesirable. In keeping with the precepts of the present invention which provides means for the simple recovery of several sodium salts from mixtures thereof with the least possible expenditure of energy, we prefer the following mthod of anhydrous sodium sulphate production.

Glauber salt is dissolved to saturation in water at 32°–35° C. To this solution we add sufficient salt trap salt (or any other suitable mixture high in sodium chloride and containing sodium sulphate and little sodium carbonate) to essentially saturate the solution with respect to sodium chloride. This treatment serves to precipitate the greater portion of the sodium sulphate as the anhydrous salt. Less sodium chloride may be added than is necessary to produce complete saturation of the solution, in which case the recovery of the anhydrous sodium sulphate will be somewhat reduced; but, the purity, in case the sodium chloride employed is badly contaminated, is materially increased.

For example, to 1150 pounds of Glauber salt, containing 510 pounds of $Na_2SO_4$, there is added 360 pounds of water, providing a total of 1000 pounds of water, and the mixture is brought to 35° C. or slightly higher. The resulting solution may be filtered or settled for the removal of insoluble matter, if desired. To this solution there is added 460 pounds of dry salt trap salt of composition supra containing approximately 307 pounds NaCl, 102 pounds $Na_2SO_4$ and 51 pounds $Na_2CO_3$. The mixture is stirred for about a half hour at 35° C. and the solid residue recovered on a suitable filter. The resulting crop of anhydrous sodium sulphate weighs 524 pounds, dry basis, and after having been given a slight displacing wash with water is essentially free from impurities, containing less than 1% NaCl and 1% $Na_2CO_3$. While the use of pure sodium chloride or the aforementioned boiling-out processes may be employed, the advantages of the preferred process are obvious. More sodium sulphate is recovered than is introduced as Glauber salt, the excess as well as that required to saturate the solution being obtained from the impure salt employed. Further, the presence of the small amount of sodium carbonate reduces the amount of sulphate which will remain in the mother liquor as compared with the case when employing pure sodium chloride. Furthermore, the small amount of carbonate reduces the quantity of sodium chloride needed to saturate the solution. The efficiency of the above process is further increased by decreasing the quantity of water employed for dissolving the Glauber salt: in which case, the quantity of common salt employed is adjusted so as to produce the desired degree of saturation with respect to sodium chloride.

The product resulting from the above process is ready for the market as recovered from the filter or other suitable equipment. It is superior for many purposes to the so-called salt cake of commerce, being free of acid and iron compounds.

Another variation of the above process consists of saturating the Glauber salt solution with respect to sodium chloride at a high temperature, say 75°–100° C. At these temperatures, anhydrous sodium sulphate is even more insoluble than at 35° C., thereby affording a greater yield of that salt. After removing the anhydrous sodium sulphate, the liquor may be cooled to 35° C. or slightly lower, and a crop of pure common salt recovered. By this method an improved yield of anhydrous sodium sulphate is recovered and a crop of pure sodium chloride is produced from the contaminated raw material. Said salt may be filtered from the liquor, washed, dried, and sold as table salt of high quality.

While the process, so far, has been described as applied to solid raw materials containing more sodium sulphate than sodium carbonate, the process may be applied to almost any mixture of sodium carbonate and sodium sulphate, either with or without contamination with sodium chloride, such mixture existing either as solids or as solutions.

In certain instances, the first step of the process may be omitted entirely, and the cold sulphate liquor or hot carbonate liquor produced by direct treatment. Any mixture or complex of carbonate and sulphate, essentially free of sodium chloride, containing more sodium carbonate than sodium sulphate, may be utilized directly for the production of the cold sulphate liquor by bringing the same to saturation at from 25° C. to 35° C. The resulting solution, when heated and saturated with sodium chloride, may precipitate burkeite and assume a composition as represented by variation from approximately point G to point $n$ of Figure 3, said solution being saturated with sodium chloride, burkeite and saturated or nearly saturated with sodium carbonate monohydrate at the particular temperature employed. Complexes or mixtures of sodium carbonate and sodium sulphate, containing the former in excess of the latter and likewise containing sodium chloride, which will, upon being brought to saturation, approximate the hot carbonate liquors represented by points from G to $n$ of line $m$—$n$ of Figure 3 or points intermediate between the same and points E and Z, respectively, which upon complete saturation with sodium chloride will fall at or near points G or $n$, may likewise be utilized directly for the production of the hot carbonate liquor.

Solid residues resulting from the saturation of cold sulphate liquor with sodium chloride, (said process being carried out hot), which residues contain sodium carbonate in excess of the sodium sulphate, may be employed as aforementioned for the production of the cold sulphate liquor by direct dissolution.

However, we have found that unless the ratio of carbonate to sulphate in the chloride free residue is well over a fixed value, as specified below, it is not most economical or efficient to remove it from the leaching step and to subject the same to a direct dissolution step. It is preferable in such instance to dissolve up as much as possible of the excess carbonate remaining in such chloride free sludge. This is based upon the fact that any solid complex or mixture containing more carbonate than sulphate must contain free sodium carbonate, uncombined with complexes. Hence, prior to the removal of the sludge from the leach step, additional water and sodium chloride may be added thereto, in order to dissolve the carbonate and arrive at a point saturated with respect to sodium chloride, sodium carbonate monohydrate and burkeite, simulating point $n$ of Figure 3, for the particular temperature employed.

While fresh water may be used for this purpose, we have found it advantageous to employ the mother liquor from the final refrigeration step, in which sal soda is precipitated, for this purpose. It will be seen from the following description that such liquor contains certain residual values of sodium carbonate which may advantageously be added to the system at this point.

The process being a cyclic one, it is obvious that any material should be introduced at that point of the process where the solution to be formed corresponds to the composition of the solution to be treated. In any case, the principles and steps of the process remain essentially the same and changes made only in the relative amounts of sodium sulphate, sodium chloride and sodium carbonate recovered. The process of this invention is applicable to the separation and refining of one or more of the three salts from almost any of an infinite number of combinations of the same, either in the solid state or in concentrated solution. The basic principles of the process, as herein set forth in detail and by solubility diagrams, comprise the essence of the present invention. The details for treating various mixtures for the production of the desired products and/or solutions therefrom are too numerous to list in detail, due to the multiplicity of possible starting combinations or raw materials; but, the basic principles of the process are set forth herein clearly and in such a manner that one skilled in the art may make use of the same.

Along the line of producing the hot carbonate liquor by direct means as just described, we wish to set forth an example thereof as applied to the recovery of values from certain natural brines, containing carbonate, sulphate and chloride of sodium. Such process likewise comprises a suitable method for producing burkeite, from which sodium sulphate and sodium carbonate may be produced, as herein described.

In treatment of Owens Lake brine, approximately 141 gallons or 1529 pounds of brine is taken which has essentially the following composition:

| | Per cent by weight | Pounds |
|---|---|---|
| $Na_2CO_3$ | 11.0 | 168 |
| $Na_2SO_4$ | 4.5 | 69 |
| NaCl | 13.1 | 200 |
| Other salts | 6.0 | 92 |
| Water | 65.4 | 1000 |
| Total | 100.0 | 1529 |

This solution is heated to 75° C. or above, and 100 pounds of sodium chloride added. The mixture is stirred until essentially all the sodium chloride is dissolved, this amount of sodium chloride being essentially the correct amount which just saturates the soluttion. In so doing, approximately 67 pounds of burkeite are precipitated. In this manner a crop of burkeite is recovered from which sodium sulphate and sodium carbonate may be manufactured as herein described. Even larger yields of burkeite may be obtained by this simple expedient of heating and saturating with respect to sodium chloride certain other natural brines, notably Searles Lake brine. The hot brine resulting from this burkeite precipitation may be cooled for the separation of pure sodium chloride.

The residual liquor, in the case of the aforementioned Owens Lake brine, after filtering out the precipitated burkeite had the following composition:

| | Pounds |
|---|---|
| $Na_2CO_3$ | 150 |
| $Na_2SO_4$ | 20 |
| NaCl | 300 |
| Other salts | 92 |
| Water | 1000 |
| Total | 1562 |

It may be seen that the above liquor corresponds very closely to the hot carbonate liquor produced from solid salt mixtures. To be of value the hot carbonate liquor, saturated with sodium chloride, should contain a high sodium carbonate content and a low sodium sulphate content, it being understood that the higher the carbonate and the lower the sulphate, the more valuable this liquor will be in the subsequent steps for recovery of sodium carbonate. Liquor, resulting from the treatment of Owens Lake brine as shown above (but not that resulting from the precipitation of burkeite from Searles Lake brine), fulfills the stated requirements. Hence, by this method, the desired hot carbonate liquor is produced directly from a raw material.

When a complex or mixture, substantially free of sodium chloride, contains 50% or more sodium carbonate in excess of the sodium sulphate, then we find it advantageous to treat such mixtures in a manner quite similar to that originally described in connection with the production of Glauber salt but, in this case, recovering primarily, a valuable crop of sal soda. For example, to 1100 pounds of a complex containing 62.5% $Na_2CO_3$ and 21.0% $Na_2SO_4$, the remainder being essentially water and insoluble matter, we add 1530 pounds of water. The mixture is stirred and maintained at 25° C. for an hour or so, means for cooling being supplied since the reaction is exothermic. In dissolving, the composition of the solution follows along line O—Y of Figure 3 to a point Y, saturated with respect to sal soda. The complex then continues to dissolve, increasing the sodium sulphate concentration of the solution and precipitating sal soda. A crop of the latter, weighing 1128 pounds, on a dry basis, containing 418 pounds of sodium carbonate, is recovered, representing a direct recovery of approximately 61% of the sodium carbonate introduced.

Just sufficient of the complex or mixture may be added to water to bring the resulting solution to a point E. However, it may be preferable to stop such addition somewhat short of point E, say at point Z. The solution of composition represented by point E is analogous to the cold sulphate liquor produced above, and may be so termed. Any solution having a composition between points Z and E on the line $k$—E comprises a suitable cold sulphate liquor for the subsequent production of hot carbonate liquor. A solution of composition Z, when heated and saturated with sodium chloride, precipitates burkeite, traveling along the line Z—$n$ to approximately point $n$ saturated with burkeite, sodium chloride and sodium carbonate monohydrate, which is the optimum composition for the hot carbonate liquor at its particular temperature of production. The precipitated burkeite, having a ratio of sodium carbonate to sodium sulphate less than unity, may be utilized, as before described, for the production of sodium sulphate, cold sulphate liquor, and further quantities of hot carbonate liquor. The precipitated sal soda may be included with that obtained, in following steps, from the hot carbonate liquor and used for the final production of soda ash.

The foregoing sal soda precipitation from sulphate-carbonate mixtures containing sodium carbonate in excess of 50% of the sodium sulphate value is, like the Glauber salt precipitation, dependent upon essential freedom from sodium chloride. Hence, the various means of extracting sodium chloride from the raw material, as set forth for the case of Glauber salt production, must be applied in this instance. One of the preferred methods is the leaching of the sodium chloride therefrom, if such exists, by means of the cold sulphate liquor, the residue being employed as just described. Other means, such as water leaching, may be employed according to the precepts of this invention.

The hot carbonate liquor, resulting from the foregoing treatment and precipitation of burkeite from any of the above examples, may be treated with ammonia to precipitate the carbonate content, or treated in any other preferred or desired manner. This hot carbonate liquor, being relatively free from sodium sulphate, is useful in many instances as a raw material—for example, for the manufacture of caustic soda by the lime process. However, we prefer to take this hot carbonate liquor which may have a composition approximating point G of Figure 3 for the particular temperature in question, and cool the same to a temperature considerably below that of the transition point of the monohydrate of sodium carbonate to the heptahydrate, which in saturated sodium chloride solution is about 26° C. As the solution is cooled, the composition remains essentially constant along the line G—H since the cooling causes the solution to become unsaturated with respect to burkeite and also with the monohydrate of sodium carbonate if the solution were originally saturated with this salt at point n.

If the hot carbonate liquor, saturated with sodium chloride, was produced at a high temperature, a crop of sodium chloride will be precipitated by cooling just to the point at which a hydrated carbonate of sodium begins to precipitate; in which case, the same may be recovered to advantage as a marketable product. On the other hand, if the hot carbonate liquor has been produced at a relatively low temperature, then only a very small crop of sodium chloride may be precipitated, said crop being too small in certain instances to pay to handle. In such case, it may be desirable to slightly dilute before cooling.

At point H, the solution becomes saturated with a higher hydrate of sodium carbonate. In the case of the particular condition chosen for illustration, the point H is in the dekahydrate field at about 20° C. Further cooling is carried on to, say, 5° C. which causes crystallization of sodium carbonate dekahydrate, the solution following the composition line along curve H—J. The removal of water from the solution as combined water of crystallization of the sodium carbonate dekahydrate, tends to slightly concentrate the other soluble constituents, such as sodium sulphate and chloride.

At the point J, the solution has approached very closely to saturation with sodium sulphate dekahydrate and cooling is therefore stopped and the crop of sodium carbonate dekahydrate crystals removed. The liquor remaining is either discarded or further treated to recover the sodium chloride content. As previously set forth a portion of this mother liquor may be employed to advantage in case sodium carbonate monohydrate is to be leached from the salt residues in the hot carbonate liquor production step.

Said concentration may cause the precipitation of a small amount of sodium chloride. This effect may be neglected in cases where high purity of product is not of paramount importance. However, where a product of highest purity is desired, it is preferable to add to the solution sufficient water to maintain therein any sodium chloride which would tend to precipitate in refrigerating to a low temperature. This water may be added directly to the hot carbonate liquor in case no sodium chloride recovery is desired, or it may be added to said liquor after partial cooling and removal of the precipitated salt prior to the precipitation of the main crop of sodium carbonate. In any case, the quantity of water added for this purpose is a small fraction of the total weight of the solution. In the foregoing illustration the sodium chloride precipitated by cooling to about 20° C. is allowed to settle and removed from the liquor. To the clear liquor we add 4–5% of fresh water by weight prior to the step of refrigerating to about 5° C.

Referring to the specific example of the hot carbonate liquor obtained by precipitation of burkeite from such as Owens Lake brine and assuming that sodium chloride production is not desirable in this instance, to 1562 pounds of this liquor we add 110 pounds of water and then cool the mixture from 75° C. to approximately 15° C. at which point it reaches saturation with sodium carbonate dekahydrate.

A further cooling to approximately 0° C. caused a separation of about 300 pounds of essentially pure sodium carbonate dekahydrate equivalent to about 110 pounds of anhydrous sodium carbonate. The remaining solution had approximately the following composition:

| | Pounds |
|---|---|
| $Na_2CO_3$ | 40 |
| $Na_2SO_4$ | 20 |
| NaCl | 300 |
| Other salts | 92 |
| Water | 920 |

This solution was discarded but could have been evaporated for the recovery of sodium chloride and/or the other salts.

While the processes herein described provide means for efficiently separating mixtures, compounds or complexes, both as solids and solutions, containing sodium carbonate, sodium sulphate and sodium chloride into the constituent parts of such, merely by subjecting the same to solution and temperature changes, the process may be economically operated for the recovery of sodium sulphate, sodium carbonate and sodium chloride of high degree of purity, also from mixtures containing considerable other impurities, such as borates and potassium salts.

The sal soda produced by suitable refrigeration of hot carbonate liquor, produced by any of the aforementioned means, may be filtered off on a continuous vacuum filter or other suitable equipment. A slight wash of cold water may be applied for displacing the adhering liquor. This product is suitable for the market as such; but, due to market conditions, freight rates, etc., it is preferable to remove the greater proportion of water therefrom, as in the case of Glauber salt. For example, sal soda may be dissolved in a minimum of water at or near the temperature of maximum solubility, about 35° C. From this point, sodium carbonate monohydrate may be produced by any one of the methods described above for the production of anhydrous sodium sulphate from Glauber salts. As in the foregoing example, in keeping with the precepts of this invention, we prefer to produce the lesser hydrated carbonate by means employing the least expenditure of energy, i. e. by the salting out method.

For example, to 1463 pounds of pure, wet sal soda, containing 532 pounds of $Na_2CO_3$, there is added 160 pounds of water, providing a total of 1623 pounds of solution, when the mixture is brought to 35° C. The resulting solution may be filtered or settled for the removal of insoluble matter, if desired. To this solution there is added 250 pounds of sodium chloride, and the mixture stirred and maintained at 35° C. for about a half hour. The solid residue, comprising 320 pounds of $Na_2CO_3.H_2O$, on a dry basis, may be recovered from the solution by means of a filter or centrifugal machine. A slight wash with warm water serves to displace the adhering liquor. The 320 pounds of sodium carbonate monohydrate may be marketed as such, or it may be dried for the removal of the greater portion of the water of crystallization, producing approximately 275 pounds of dense soda ash of high purity.

End liquor from this salting-out process may be returned to the hot carbonate liquor for further recovery of the sodium carbonate content thereof, thereby providing a satisfactory overall yield value for the combined process.

As in the case of anhydrous sodium sulphate manufactured from Glauber salt, impure sodium chloride may be employed for saturating the sodium carbonate solution. Any sodium carbonate therein contained is added to the yield of sodium carbonate monohydrate produced. Sodium sulphate, if not exceeding approximately 12% of the sodium chloride content of the impure salt employed, remains in solution at 35° C. and does not contaminate the precipitated carbonate.

The efficiency of the above process may be further increased by decreasing the quantity of water employed for dissolving the sal soda, in which case the amount of sodium chloride employed is adjusted so as to produce the desired degree of saturation with respect to the same.

As in the case of Glauber salt conversion, a higher temperature of saturation with sodium chloride, say 75°–100° C. results in a more complete precipitation of sodium carbonate monohydrate from the solution.

While the particular processes herein described are well adapted to carry out the objects of the present invention, it is to be understood that various modifications and changes may be made without departing from the principles of the invention, and the invention includes all such modifications and changes as come within the scope of the appended claims.

We claim:

1. A process of treating sodium carbonate-sodium sulphate complexes which comprises, bringing the salts to saturation in water at a temperature below the transition point of Glauber salt to anhydrous sodium sulphate and then exceeding the saturation point of the solution, increasing the percentage of sodium carbonate in the solution while forming a solid phase of Glauber salt.

2. A process of treating sodium carbonate-sodium sulphate complexes which comprises, bringing the salts to saturation in water free of sodium chloride, at a temperature below the transition point of Glauber salt to anhydrous sodium sulphate and then exceeding the saturation point of the solution, increasing the percentage of sodium carbonate in the solution while forming a solid phase of Glauber salt.

3. A process of treating sodium carbonate-sodium sulphate complexes which comprises, bringing the salts to saturation in water at a temperature below the transition point of Glauber salt to anhydrous sodium sulphate, and then providing an excess of the complex in contact with the solution so as to increase the sodium carbonate concentration of the solution while providing Glauber salt as a solid phase, the excess complex provided being sufficient to bring the composition of the solution to substantially the solubility at said temperature of sodium carbonate dekahydrate.

4. A process of treating sodium carbonate-sodium sulphate complexes which comprises, bringing the salts to saturation in water at a temperature below the transition point of Glauber salt to anhydrous sodium sulphate, and then providing an excess of the complex in contact with the solution so as to increase the sodium carbonate concentration of the solution while providing Glauber salt as a solid phase, the excess complex added and the temperature of the solution being such as to bring the composition of the solution to substantially the transition point between burkeite, Glauber salt and solid carbonate dekahydrate.

5. A process of treating sodium carbonate-sodium sulphate complexes which comprises, digesting the solid salts with just sufficient water to dissolve substantially all the sodium carbonate at a temperature below the transition point of Glauber salt to anhydrous sodium sulphate, crystallizing the excess sodium sulphate as Glauber salt, and forming a solution nearly saturated with respect to burkeite and sodium carbonate dekahydrate.

6. A process of treating burkeite which comprises, digesting burkeite with just sufficient water to dissolve all of the sodium carbonate content at a temperature close to the temperature of the transition point between burkeite, Glauber salt and sodium carbonate dekahydrate, while crystallizing out sodium sulphate salt, just sufficient burkeite being digested to form a solution near the transition point between burkeite, Glauber salt and sodium carbonate dekahydrate.

7. A process of treating sodium carbonate-sodium sulphate complexes which comprises, heating a solution of the sodium carbonate-sodium sulphate complex at a temperature above the transition point of sodium carbonate and sodium sulphate to the double salt burkeite, which solution of the complex contains a greater ratio of sodium carbonate to sodium sulphate than the ratio of these salts in burkeite, and then adding sodium chloride to the solution in sufficient quantities to depress the solubility of burkeite in the solution and cause the solution to precipitate burkeite and materially increase its carbonate to sulphate ratio.

8. A process of treating sodium carbonate-sodium sulphate complexes which comprises, heating the solution of the complexes, containing greater ratio of carbonates to sulphates than the ratio of these constituents in burkeite, to a temperature substantially above the transition point of sodium carbonate and sodium sulphate to the double salt burkeite, adding sodium chloride to the solution to nearly saturate the same therewith, and precipitating burkeite from the solution, the solution operated upon containing a ratio of carbonate to sulphate sufficiently high so that such precipitation of burkeite brings the composition of the solution nearly to saturation with sodium carbonate monohydrate.

9. A process of treating sodium carbonate-sodium sulphate complexes which comprises, heating a solution of the complexes to a temperature substantially above the transition point of sodium carbonate and sodium sulphate to the double salt burkeite, which solution contains a carbonate-sulphate ratio substantially corresponding to the ratio of carbonate to sulphate of a solution at said transition point, and substantially saturating the solution with sodium chloride thereby precipitating burkeite.

10. A process of treating sodium carbonate-sodium sulphate complexes which comprises, heating a solution of the complexes to a temperature substantially above the transition point of sodium carbonate and sodium sulphate to the double salt burkeite, which solution contains a carbonate-sulphate ratio substantially corresponding to the ratio of carbonate to sulphate of a solution at said transition point, and substantially saturating the solution with sodium chloride thereby precipitating burkeite, the saturation of the solution with sodium chloride being effected by adding mixed salt of sodium chloride and burkeite in just sufficient quantities so that substantially all of the sodium chloride content of the mixed salt is dissolved in saturating said solution.

11. A process of treating burkeite containing sodium chloride which comprises, first leaching from the burkeite its sodium chloride content, then digesting the remaining solid salt with just sufficient water to dissolve all of the sodium carbonate and form a solution having approximately the carbonate composition of the transition point between sodium carbonate, sodium sulphate and the double salt burkeite, the salt being dissolved substantially at the transition temperature between sodium carbonate and sodium sulphate and the double salt burkeite.

12. A process of treating sodium carbonate-sodium sulphate complexes which comprises, digesting the complexes with sufficient water to dissolve essentially all of the sodium carbonate content of the complex and form a solution of substantially the composition of the transition point between sodium carbonate, sodium sulphate and the double salt burkeite, the temperature being maintained substantially at the temperature of said transition point, while crystallizing the excess sodium sulphate, then heating the solution at a temperature substantially above the said transition point and substantially saturating the same with sodium chloride thereby precipitating burkeite.

13. A process of treating sodium carbonate-sodium sulphate complexes which comprises, digesting the complexes with sufficient water to dissolve essentially all of the sodium carbonate content of the complex and form a solution of substantially the composition of the transition point between sodium carbonate, sodium sulphate and the double salt burkeite, the temperature being maintained substantially at the temperature of said transition point, while crystallizing the excess sodium sulphate, then heating the solution to a temperature substantially above the said transition point and substantially saturating the same with sodium chloride, thereby precipitating burkeite, and employing the separated burkeite as a sodium carbonate-sodium sulphate complex in said digesting operation.

14. A process of treating sodium carbonate-sodium sulphate complexes which comprises, digesting the complexes with sufficient water to dissolve essentially all of the sodium carbonate content of the complex and form a solution of substantially the composition of the transition point between sodium carbonate, sodium sulphate and the double salt burkeite, the temperature being maintained substantially at the temperature of said transition point, while crystallizing the excess sodium sulphate, then heating the solution to a temperature substantially above the said transition point and substantially saturating the same with sodium chloride thereby precipitating burkeite, and employing the separated burkeite as a sodium carbonate-sodium sulphate complex in said digesting operation, the solution being saturated with sodium chloride by adding a mixed salt of sodium chloride and burkeite containing just sufficient sodium chloride to substantially saturate said solution so that its burkeite content remains undissolved.

15. A process of recovering sodium sulphate from sodium carbonate-sodium sulphate complexes which consists in digesting the solid salts with sufficient water to just dissolve essentially all of the sodium carbonate at a temperature below the transition point of Glauber salt to anhydrous sodium sulphate, crystallizing the excess sodium sulphate as Glauber salt, separating the said Glauber salt from the solution, adding sodium chloride to the liquor and heating the liquor to a temperature above the transition point of sodium carbonate and sodium sulphate to the double salt, burkeite, sufficient sodium chloride being added to essentially saturate the solution, separating the precipitated burkeite from the solution, and returning said burkeite to provide solid salts in said digesting operation.

16. A process of treating mixtures composed essentially of sodium carbonate-sodium sulphate and sodium chloride which consists in leaching the mixture with sufficient water to dissolve essentially all the sodium chloride, separating the carbonate sulphate residue from the solution, digesting said residue with sufficient water to dissolve essentially all the sodium carbonate at a temperature below the transition point of Glauber salt to anhydrous sodium sulphate, crystallizing the excess sodium sulphate as Glauber salt, heating the solution and adding the solid mixture of sodium chloride and burkeite in sufficient quantities to saturate the solution with chloride at a temperature above the transition point of sodium carbonate and sodium sulphate to burkeite, thereby precipitating burkeite from the solution, separating the mixture of undissolved and precipitated burkeite from the solution, and returning said burkeite to the aforesaid cycle of operations.

17. A process of treating solutions containing sodium carbonate and sodium sulphate in quantities sufficient to allow precipitation of portions of said salts in the form of burkeite by saturating said solutions with sodium chloride at an elevated temperature, which comprises bringing said solutions to saturation with sodium chloride at a temperature above the transition point of sodium carbonate and sodium sulphate to burkeite, separating the precipitated burkeite from the solution, digesting said burkeite in just sufficient water to dissolve essentially all the sodium carbonate at a temperature below the transition point of Glauber salt to anhydrous sodium sulphate, crystallizing the excess sodium sulphate as Glauber salt, and then heating and saturating said solution with sodium chloride as in the first mentioned operation.

18. A process of treating sodium carbonate-sodium sulphate complexes which comprises, heating a solution of the complex at a temperature above the transition point of sodium carbonate and sodium sulphate to the double salt burkeite, which solution of the complex contains a greater ratio of sodium carbonate to sodium sulphate than the ratio of these salts in burkeite, then adding sodium chloride to the solution in sufficient quantities to depress the solubility of burkeite in the solution and cause the solution to precipitate burkeite and materially increase the ratio of carbonate to sulphate, and finally precipitating sodium carbonate dekahydrate from the solution.

19. A process of treating sodium carbonate-sodium sulphate complexes which comprises, heating a solution of the complex containing a greater ratio of carbonates to sulphates than the ratio of these constituents in burkeite to a temperature substantially above the transition point of sodium carbonate and sodium sulphate to the double salt burkeite, adding sodium chloride to the solution to nearly saturate the same therewith and precipitating burkeite from the solution, the solution operated upon containing a ratio of carbonate to sulphate sufficiently high so that such precipitation of burkeite brings the composition of the solution nearly to saturation with sodium carbonate monohydrate, and then cooling the solution to precipitate sodium carbonate dekahydrate.

20. A process of treating sodium carbonate-sodium sulphate complexes which comprises, heating the solution of the complexes to a temperature substantially above the transition point of sodium carbonate and sodium sulphate to double salt burkeite, which solution contains a carbonate-sulphate ratio substantially corresponding to the ratio of carbonate to sulphate of a solution at said transition point, substantially saturating the solution with sodium chloride thereby precipitating burkeite, and finally cooling the solution to precipitate sodium carbonate dekahydrate.

21. A process of treating sodium carbonate-sodium sulphate complexes which includes the following cycle of operations, digesting a complex of sodium carbonate-sodium sulphate within the Glauber salt field while precipitating Glauber salt and producing a solution near the composition of the transition point between sodium carbonate dekahydrate, Glauber salt and burkeite, then heating the solution to a temperature substantially above the temperature of said transition point and saturating the solution with sodium chloride to precipitate burkeite, and then cooling the solution and precipitating sodium carbonate dekahydrate.

22. A process of treating sodium carbonate-sodium sulphate complexes which includes the following cycle of operations, digesting a complex of sodium carbonate-sodium sulphate within the Glauber salt field while precipitating Glauber salt and producing a solution near the composition of the transition point between sodium carbonate dekahydrate, Glauber salt and burkeite, then heating the solution to a temperature substantially above the temperature of said transition point and saturating the solution with sodium chloride to precipitate burkeite, then cooling the solution and precipitating sodium carbonate dekahydrate, the burkeite precipitated being recycled to a digesting operation.

23. A process of treating sodium carbonate-sodium sulphate complexes which comprises, heating a solution of complexes to a temperature substantially above the transition point of sodium carbonate and sodium sulphate to the double salt burkeite, which solution contains a carbonate-sulphate ratio substantially corresponding to the ratio of carbonate to sulphate of a solution at said transition point, substantially saturating the solution with sodium chloride, thereby precipitating burkeite, the saturation of the solution with sodium chloride being effected by adding a mixed salt of sodium chloride and burkeite in just sufficient quantities so that substantially all of the sodium chloride content of the mixed salt is dissolved in saturating the said solution, and cooling the solution to precipitate the dekahydrate of sodium carbonate.

24. A process of treating burkeite containing sodium chloride and excess sodium carbonate which comprises, first leaching from the burkeite the sodium chloride and excess sodium carbonate content, then digesting the remaining solid salt with just sufficient water to dissolve all of the sodium carbonate of the salt and form a solution having approximately the carbonate composition of a transition point between sodium carbonate-sodium sulphate and the double salt burkeite, adding to said solution the solution formed by said leaching operation, heating and saturating the resulting solution with sodium chloride to precipitate burkeite, and cooling the solution to precipitate sodium carbonate dekahydrate.

25. A process of treating sodium carbonate-sodium sulphate complexes which comprises, digesting the complexes with sufficient water to dissolve essentially all of the sodium carbonate content of the complex and form a solution of substantially the composition of the transition point between sodium carbonate, sodium sulphate and the double salt burkeite, the temperature being maintained substantially at the temperature of said transition point, while crystallizing the excess sodium sulphate, then heating the solution at a temperature substantially above the said transition point and substantially saturating the same with sodium chloride thereby precipitating burkeite, and then cooling the solution to precipitate sodium carbonate dekahydrate.

26. A process of treating sodium carbonate-sodium sulphate complexes which comprises, digesting the complexes with sufficient water to dissolve essentially all of the sodium carbonate content of the complex and form a solution of substantially the composition of the transition point between sodium carbonate, sodium sulphate and the double salt burkeite, the temperature being maintained substantially at the temperature of said transition point, while crystallizing the excess sodium sulphate, then heating the solution at a temperature substantially above the said transition point and substantially saturating the same with sodium chloride thereby precipitating burkeite, employing the separated burkeite as a sodium carbonate-sodium sulphate complex in said digesting operation, and then cooling the solution to precipitate sodium carbonate dekahydrate.

27. A process of treating sodium carbonate-sodium sulphate complexes which comprises, digesting the complexes with sufficient water to dissolve essentially all of the sodium carbonate content of the complex and form a solution of substantially the composition of the transition point between sodium carbonate, sodium sulphate and the double salt burkeite, the temperature being maintained substantially at the temperature of said transition point, while crystallizing the excess sodium sulphate, then heating the solution to a temperature substantially above the said transition point and substantially saturating the same with sodium chloride thereby precipitating burkeite, employing the separated burkeite as a sodium carbonate-sodium sulphate complex in said digesting operation, the solution being saturated with sodium chloride by adding a mixed salt of sodium chloride and burkeite containing just sufficient sodium chloride to substantially saturate said solution, its burkeite content remaining undissolved, and then cooling the solution to precipitate sodium carbonate dekahydrate.

28. A process of recovering sodium sulphate from sodium carbonate-sodium sulphate complexes which consists in digesting the solid salts with sufficient water to just dissolve essentially all of the sodium carbonate at a temperature below the transition point of Glauber salt to anhydrous sodium sulphate, crystallizing the excess sodium sulphate as Glauber salt, separating the said Glauber salt from the solution, adding sodium chloride to the liquor and heating the liquor to a temperature above the transition point of sodium carbonate and sodium sulphate to the double salt burkeite, sufficient sodium chloride being added to essentially saturate the solution, separating the precipitated burkeite from the solution, returning said burkeite to provide solid salts in said digesting operation, and then cooling the solution to precipitate sodium carbonate dekahydrate.

29. A cyclical process of treating mixtures of burkeite, sodium carbonate monohydrate, and sodium chloride which comprises digesting burkeite in sufficient water, substantially free of sodium chloride at a temperature below the transition point of Glauber salt, sal soda and burkeite, to dissolve essentially all the carbonate therein while crystallizing the excess sulfate as Glauber salt and forming a solution essentially saturated with Glauber salt and sal soda, separating the precipitated Glauber salt from the saturated liquor, heating the resulting clear solution to a temperature substantially above said transition point, bringing said solution into contact with said raw material containing burkeite, sodium carbonate monohydrate, and sodium chloride, the sodium chloride therein contained being not greater than that required for saturating the resulting hot solution, effecting dissolution of the sodium carbonate monohydrate present, bringing the solution to substantial saturation with sodium chloride while dissolving from the solid residue substantially all sodium chloride, thereby forming a hot solution essentially saturated with sodium chloride, burkeite, and sodium carbonate monohydrate, separating the solid residue from the hot solution and returning said residue to the digestion operation in water at a temperature below said transition point, cooling the resulting clear solution to the point of precipitating a hydrated sodium carbonate, separating sodium chloride so precipitated, adding water to prevent further deposition of sodium chloride, and then refrigerating the resulting clear solution to precipitate sodium carbonate dekahydrate and separating said carbonate from the refrigerated solution.

30. A process of treating solutions containing sodium carbonate and sodium sulphate in quantities sufficient to allow precipitation of portions of said salts in the form of burkeite by saturating said solutions with sodium chloride at an elevated temperature, which comprises adding sodium chloride to said solutions at a temperature above the transition point of sodium carbonate and sodium sulphate to burkeite, separating the precipitated burkeite from the solution, digesting said burkeite in just sufficient water to dissolve essentially all the sodium carbonate at a temperature below the transition point of Glauber salt to anhydrous sodium sulphate, crystallizing the excess sodium sulphate as Glauber salt, then heating and saturating said solution with sodium chloride as in the first mentioned operation, and then cooling the solution to precipitate sodium carbonate dekahydrate.

31. A process of separating sodium carbonate-sodium sulphate complexes which comprises the following cycle of operations: dissolving a complex of sodium carbonate and sodium sulphate in such proportions of sodium carbonate and sodium sulphate and at such temperature that the resulting solution becomes saturated with Glauber salt before complete solution of the complex and Glauber salt is precipitated while the remainder of the complex is dissolved, then precipitating burkeite from the solution, precipitating sodium carbonate from the solution, and recycling the burkeite to the first operation.

32. A process of treating sodium carbonate-sodium sulphate complexes which comprises, digesting the complex in water until a solution is formed saturated with respect to one of the components, then continuing to digest the complex with said solution while enriching the solution in one of the components, and precipitating the other component as a hydrated salt.

33. A process of treating sodium carbonate-sodium sulphate complexes which comprises, bringing the salts to saturation in water free of sodium chloride at a temperature close to the temperature of transition between Glauber salt, sal soda and burkeite, and continuing to digest the complex, precipitating one component as a hydrated salt while enriching the solution in the other component, sufficient complex and water being employed to form a solution with the composition approximating the composition of a solution at the transition point between Glauber salt, sal soda and burkeite.

34. A process of treating sodium carbonate-sodium sulphate complexes which comprises, bringing the salts to saturation in water free of sodium chloride at a temperature close to the temperature of transition between Glauber salt, sal soda and burkeite, and continuing to digest the complex, precipitating one component as a hydrated salt while enriching the solution in the other component, sufficient complex and water being employed to form a solution with the composition approximating the composition of a solution at the transition point between Glauber salt, sal soda and burkeite, heating the solution to a temperature substantially above the temperature of said transition point and essentially saturating the solution with sodium chloride to precipitate burkeite.

35. A process of treating sodium carbonate-sodium sulphate complexes which comprises, heating a solution of complexes at a temperature above the transition point of sodium carbonate and sodium sulphate to the double salt burkeite, which solution of the complex contains a greater ratio of sodium carbonate to sodium sulphate than the ratio of these salts in burkeite, then employing said solution to digest a complex of sodium carbonate and sodium sulphate containing sodium chloride, and uncombined sodium carbonate while bringing the solution essentially to saturation with sodium chloride, thereby to precipitate burkeite while leaving the burkeite of the leached salts in solid phase.

36. A process of treating sodium carbonate-sodium sulphate complexes which comprises, digesting a sodium carbonate sodium-sulphate complex containing an excess of sodium carbonate over that existing in burkeite with a solution of sodium carbonate and sodium sulpate at a temperature above the transition point of sodium carbonate and sodium sulphate to burkeite so as to leach the excess sodium carbonate from said salt, bringing the solution to essential saturation with respect to sodium chloride while precipitating burkeite, and separating the burkeite from the solution.

37. A process of treating sodium carbonate-sodium sulphate complexes which comprises, bringing a solution of sodium carbonate and sodium sulphate to essential saturation with respect to sodium chloride to precipitate burkeite, separating the burkeite and cooling the solution to precipitate sodium chloride.

38. A process of treating sodium carbonate-sodium sulphate complexes which comprises, adding sodium chloride to a solution of sodium carbonate and sodium sulphate to essentially saturate the solution with sodium chloride and precipitate burkeite, separating the burkeite and cooling the solution to precipitate sodium chloride, the solution being cooled to saturation with sodium carbonate dekahydrate, separating the sodium chloride from the solution and further cooling the solution while precipitating the sodium carbonate dekahydrate.

39. A process of treating sodium carbonate-sodium sulphate complexes which comprises, heating a solution of the composition corresponding substantially to the transition point between sodium carbonate and sodium sulphate and burkeite to a temperature substantially above such transition point and then leaching with said solution a sodium sulphate-sodium carbonate complex containing an excess of sodium carbonate over that existing in burkeite, while bringing the solution essentially to saturation with sodium chloride so as to precipitate burkeite, whereby the excess sodium carbonate monohydrate in the leached salt brings the composition of the solution substantially to saturation with sodium carbonate monohydrate.

40. A process of treating sodium carbonate-sodium sulphate complexes which comprises, heating a solution of approximately the composition of a solution at the transition point between sodium carbonate and sodium sulphate and burkeite to a temperature substantially above the transition temperature of said transition point, then digesting a mixed salt of burkeite, sodium carbonate and sodium chloride with said solution until said solution is essentially saturated with sodium chloride while precipitating burkeite, said mixed salt containing an excess of sodium carbonate over that which will be dissolved by said solution, and adding water sufficient to dissolve said excess carbonate.

41. A process of treating sodium sulphate-sodium carbonate complexes which consists in digesting such a complex which contains an excess of sodium carbonate over that existing in burkeite and contains also sodium chloride with a solution of sodium carbonate and sodium sulphate which is thereby essentially saturated with sodium chloride from said complex and precipitates burkeite, the complex containing an excess of sodium carbonate over that which would be dissolved by said solution, adding sufficient water to the solution and complex to dissolve said excess sodium carbonate, removing the solution from the solid phase, and precipitating sodium carbonate dekahydrate therefrom.

42. A process of treating sodium sulphate-carbonate complexes which comprises heating a concentrated solution of said complexes to a temperature substantially above the transition point of sal soda, Glauber salt and burkeite, said solution containing more sodium carbonate than sodium sulphate, bringing the solution into contact with impure sodium chloride while maintaining the mixture at elevated temperature thereby precipitating burkeite, adding water to dissolve sodium carbonate monohydrate from the solid phase thereby forming a solution essentially saturated with respect to burkeite, sodium carbonate monohydrate and sodium chloride and then separating the solid phase of burkeite from the hot sludge.

Signed at Trona, California this 17th day of January, 1930.

WILLIAM H. ALLEN.
WILLIAM A. GALE.
CHARLES F. RITCHIE.